United States Patent

[11] 3,628,436

| | | | | |
|---|---|---|---|---|
| [72] | Inventor | Akihiko Sato<br>Tokyo, Japan | [50] | Field of Search........................... 95/42, 44 |
| [21] | Appl. No. | 824,486 | [56] | References Cited |
| [22] | Filed | May 14, 1969 | | UNITED STATES PATENTS |
| [45] | Patented | Dec. 21, 1971 | 3,474,715  10/1969  Nakamura..................... 95/42 |
| [73] | Assignee | Nippon Kogaku K.K.<br>Tokyo, Japan | | |
| [32] | Priority | May 17, 1968 | *Primary Examiner*—Samuel S. Matthews |
| [33] | | Japan | *Assistant Examiner*—Richard L. Moses |
| [31] | | 43/40597 | *Attorney*—Harry G. Shapiro |

[54] SHOCK-PREVENTING DEVICE FOR A MIRROR-MOVING MECHANISM OF A SINGLE LENS REFLEX CAMERA
4 Claims, 5 Drawing Figs.

[52] U.S. Cl........................................................ 95/42, 95/44
[51] Int. Cl...................................................... G03b 19/12

ABSTRACT: A resilient member is interposed between the mirror of a single lens reflex camera and the shutter actuated quick-return mechanism for the mirror when the quick-return mechanism is manually overridden to detain the mirror in the exposure position. The resilient member prevents the quick-return mechanism for striking the mirror when the shutter is released.

INVENTOR.
AKIHIKO SATO

INVENTOR.
AKIHIKO SATO

SHOCK-PREVENTING DEVICE FOR A MIRROR-MOVING MECHANISM OF A SINGLE LENS REFLEX CAMERA

This invention relates to a shock preventing device for the mirror moving mechanism of a single lens reflex camera.

In the conventional camera having a mirror detent device for retaining the mirror at its exposure position and having a quick-return positioning device for the mirror in which the mirror is biased by a spring toward its viewing position and driven by a driving lever to its exposure position, if the shutter is released while the mirror is retained by the mirror detent device at its exposure position, the driving lever hits the pin which is fixed on the mirror to engage with the driving lever. This contact may cause a metallic sound at the time of impact.

An object of this invention is to overcome the above-mentioned defects.

The shock preventing device of this invention mainly comprises mirror means for a single-lens reflex camera movable between the viewing position and the exposure position and normally biased to said viewing position, driving means engaged with said mirror means and the camera shutter to move the mirror means from said viewing position to the exposure position. When the camera shutter is released, manual operating means engageable with said mirror means for moving the mirror means to said exposure position independently of said driving means, and stopping means cooperating with said manual operating means to move from a first position outside of the range of the movement of said driving means to a second position within said range of said driving means. With this arrangement, when the mirror means is arrested at the exposure position by said manual operating means, said stopping means is located at said second position and said driving means is stopped by said stopping means before engaging with said mirror means, and only the camera shutter is actuated.

The objects and advantages of the present invention will be more apparent from the following description referring to an embodiment of the invention shown in the drawings, in which.

Figure 1:
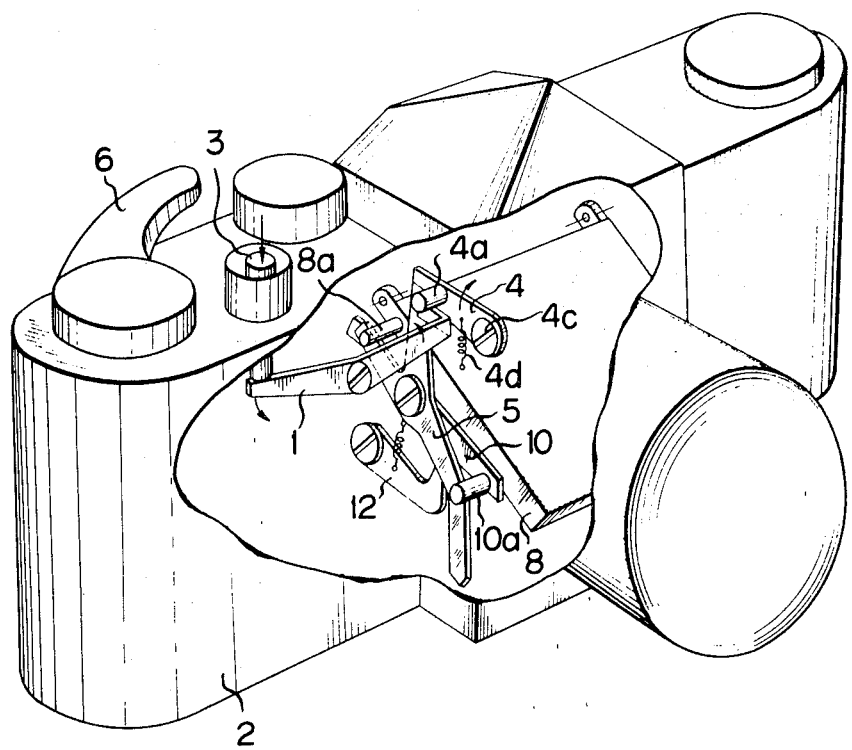
FIG. 1 is a perspective view of an embodiment of this invention.

In FIGS. 1 through 5, 1 is a rocking lever, rotatably supported by a camera body 2. One end of said lever 1 is in contact with a shutter release button 3 and the other end with a pin 4a of a stop lever 4 so as to rock the stop lever 4 in the direction of the arrow when the shutter release button 3 is depressed. The stop lever 4 is supported at one end by a shaft 4c supported by the camera body. The stop lever 4 has a projecting pin 4a at a specified position and is biased in the counterclockwise direction by a spring 4d. The other end of the said lever 4 forms a notched portion 4b which engages with the upper end 5a of a quick-return or first lever 5 for stopping the lever 5.

Figure 2:
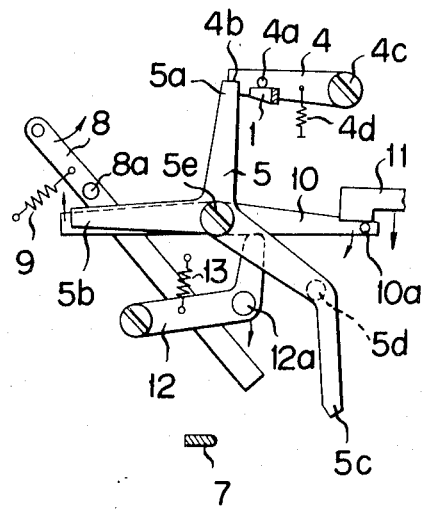
FIG. 2 is a side view of the embodiment shown in FIG. 1 before releasing the shutter.

The quick-return lever 5 is formed in a star shape, the center part of which is rotatably supported by shaft 5e connected to the camera body 2 (refer to FIG. 2). The lever 5 is linked to film advance lever 6 so as to store energy for its subsequent rotation upon the operation of a film advance lever 6. Moreover, as shown in FIG. 2, the upper end portion 5a of the lever 5 is formed to stop the quick-return lever 5 by engaging with the notched portion 4b of the stop lever 4, the left end portion 5b is formed to contact with a mirror pin 8a of a mirror 8, and the lower end portion 5c is formed to contact with a shutter release lever 7. A projecting elastic member or first protrusion 5d is formed at a specified position on the surface of the quick-return lever facing a limiting lever 12 described later.

Figure 3:
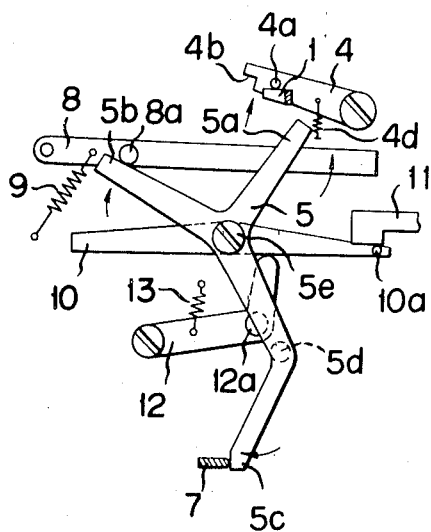
FIG. 3 is a side view similar to FIG. 2, immediately after the shutter release.

The quick-return lever 5 is constructed so that it rotates clockwise upon the release of the upper end portion 5a from the engagement with the stop lever 4, and the left end portion 5b contacts with the mirror pin 8a and rocks the mirror 8 to a specified position as shown in FIG. 3. Simultaneously, the lower end portion 5c contacts the shutter release lever 7 and releases the shutter (not indicated in the drawing). Then the said quick-return lever can rotate to return to the original position shown in FIG. 2 by means of the stored energy from the film advance lever 6.

Figure 5:
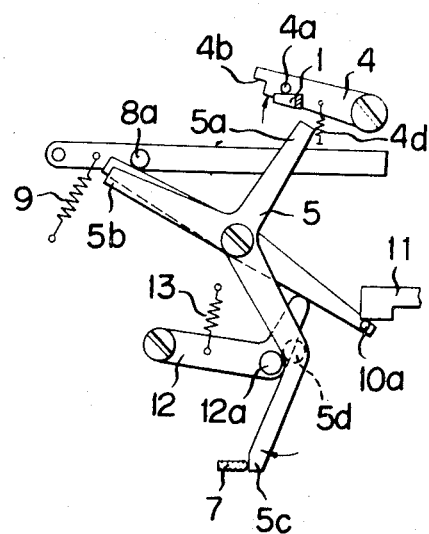
FIG. 5 is a side view similar to FIG. 2, showing the quick-return lever stopped by the shutter release.

The mirror 8 is pivotally supported by the camera body 2, and is biased in the clockwise direction by a spring 9 (refer to FIG. 2). The said mirror is so constructed as to be able to rock to a position, where the incident light from the view finder side is shielded as shown in FIG. 3 or FIG. 5, when either the said quick-return lever 5 or a manual lever 10 is operated to engage mirror pin 8a, and then to rock back to the original position by the force of the spring 9 as shown in FIG. 2.

Figure 4:
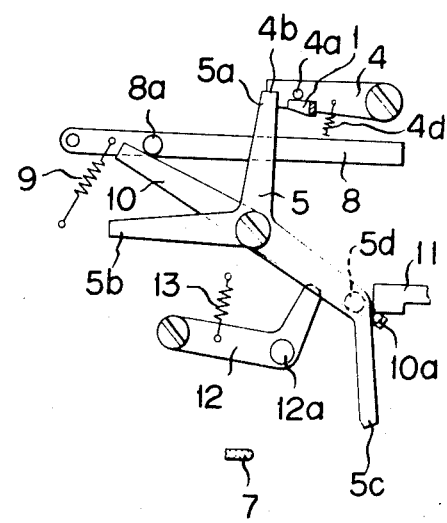
FIG. 4 is a side view similar to FIG. 2, showing the mirror fixed by the manual lever.

The manual or second lever 10 is pivotally and coaxially installed with said quick-return lever 5 on shaft 5e. One end of said manual lever 10 is formed to contact with the mirror pin 8a and a projected pin 10a is installed on the other end. The said pin 10a is installed on the other end. The said pin 10a is in contact with a manual operating member 11 which is optionally operable from outside the camera (refer to FIG. 2). The manual lever 10 is so constructed as to rock said mirror 8 to a specified position as shown in FIG. 4 by engaging the said mirror pin 8a independently of the said quick-return lever 5 when the manual operating member 11 moves in the direction of the arrow shown in FIG. 2.

The limiting or third lever 12 is pivotally connected at one end thereof to the camera body 2 and biased in the counterclockwise direction by a spring 13 (refer to FIG. 2). The other end of the limiting lever 12 is in contact with said manual lever 10, and is rockable in accordance with the rotation of the manual lever 10.

A projected elastic member or second protrusion 12a is provided on the surface of limiting lever 12 to contact the elastic member 5d of said quick-return lever 5 when limiting lever 12 is pivoted by manual lever 10. When members 5d and 12a contact each other, manual lever 10 will have pivoted to position mirror 8, so that quick-return lever 5 will be stopped by the contact of the elastic members 12a and 5d just before the left end 5b of the quick-return lever 5 contacts with the mirror pin 8a, as shown in FIG. 5.

When it is desired to place the mirror 8 in the position for exposure (horizontal position), before pressing the shutter release button, the procedure is as follows. Referring to FIGS. 2, 4 and 5, first the manual operating member 11 is shifted to the direction of the arrow as shown in FIG. 2, which rotates the manual lever 10 in the direction of the arrow by way of the pin 10a. Simultaneously, the mirror 8 rocks in the direction of the arrow by way of the mirror pin 8a and against the force of the spring 9, and the limiting lever 12 rocks in the direction of the arrow by the contact with the manual lever 10 against the force of the spring 13. As a result, the elastic member 12a moves with said limiting lever 12 from its normal or first position into a second position in the patch of movement of the elastic member 5d, as is shown in FIG. 4. After the mirror 8 has been manually positioned, the shutter button 3 is pressed in the direction of the arrow as shown in FIG. 1, causing the rocking lever 1 to lift the stop lever 4 as previously explained, thereby disengaging the upper end 5a of the quick-return lever 5. The quick-return lever 5 rotates clockwise until just before the left end 5b impacts with the mirror pin 8a, at which point it stops as shown in FIG. 5 because the said elastic member 5d makes contact with the elastic member 12a of the limiting lever 12. At the same time the lower end 5c makes contact with the shutter release lever 7 and releases the shutter which is not indicated in the drawing.

In the case of a normal shutter release, shown in FIGS. 2 and 3, the manual operating member 11 is not shifted and the elastic member 12a is positioned out of the path of movement of the elastic member 5d. When the shutter release button 3 is pressed in the direction of the arrow, the stoppage of the quick-return lever 5 by stop lever 4 is released clockwise. As the quick-return lever rotates, the left end 5b of the quick-return lever rocks the mirror 8 to the specified position by way of the mirror pin 8a as shown in FIG. 3 since the elastic member 5d is not interfered with by the elastic member 12a. Additionally, the lower end 5c makes contact with the shutter release lever 7 and releases the shutter. Since the limiting lever 12 does not operate during this period, the elastic member 5d does not make contact with the elastic member 12a.

I claim:

1. A shock-preventing device for a single-lens reflex camera having a mirror quick return and a manual mirror mode of operation comprising, in combination, mirror means movable between the viewing position and the exposure position; a first lever adapted to engage with said mirror means and actuated by the shutter release button to move between an initial position in which said mirror means is arrested at its viewing position and a second position in which said mirror means is positioned at its exposure position, said first lever having a first protrusion extending therefrom; a second lever used in the manual mirror mode of operation adapted to engage with said mirror means for optionally positioning said mirror means and retaining the latter at the exposure position prior to release of the shutter button; and a second protrusion positioned with relation to the second lever so that upon engagement of the second lever with the mirror means the second protrusion will be positioned in the path of movement of the first protrusion to contact the first protrusion and to prevent engagement of the first lever and the mirror means.

2. A shock-preventing device according to claim 1 wherein the second protrusion is positioned on a third lever pivotally engaged with the second lever, and at least one of the protrusions is made from an elastic material.

3. A shock-preventing device according to claim 2 wherein said mirror means includes a projection moved with the mirror, said first and second levers are coaxially pivoted on the camera body, each of said first and second levers being engageable with said mirror projection.

4. A shock-preventing device according to claim 3 wherein said first lever further has an arm for releasing the shutter, said first lever protrusion being provided on said arm, so that after depressing the shutter button, the first lever protrusion contacts with the second protrusion which has been positioned by said second lever in the path of movement of said first protrusion.

* * * * *